United States Patent
Houzumi et al.

(10) Patent No.: US 9,780,617 B2
(45) Date of Patent: Oct. 3, 2017

(54) BUS BAR UNIT

(71) Applicant: KAYABA INDUSTRY CO., LTD., Tokyo (JP)

(72) Inventors: Nobuji Houzumi, Kanagawa (JP); Tarou Matsumae, Kanagawa (JP); Yoshiteru Kurokawa, Kanagawa (JP); Suguru Sakamoto, Kanagawa (JP); Tohru Takimoto, Fukui (JP); Shingo Yamada, Fukui (JP)

(73) Assignee: KYB Corporation, Tokyo (JP)

( * ) Notice: Subject to any disclaimer, the term of this patent is extended or adjusted under 35 U.S.C. 154(b) by 287 days.

(21) Appl. No.: 14/772,131

(22) PCT Filed: Jan. 27, 2014

(86) PCT No.: PCT/JP2014/051648
§ 371 (c)(1),
(2) Date: Sep. 2, 2015

(87) PCT Pub. No.: WO2014/136497
PCT Pub. Date: Sep. 12, 2014

(65) Prior Publication Data
US 2016/0028286 A1    Jan. 28, 2016

(30) Foreign Application Priority Data

Mar. 8, 2013  (JP) .................. 2013-047247

(51) Int. Cl.
*H02K 3/52* (2006.01)

(52) U.S. Cl.
CPC ............ *H02K 3/522* (2013.01); *H02K 3/521* (2013.01); *H02K 2203/09* (2013.01); *H02K 2213/03* (2013.01)

(58) Field of Classification Search
CPC ................ H02K 3/52–3/525; H02K 2203/09
See application file for complete search history.

(56) References Cited

U.S. PATENT DOCUMENTS

| | | | |
|---|---|---|---|
| 2007/0188030 A1* | 8/2007 | Drubel | H02K 3/505 310/71 |
| 2013/0200743 A1* | 8/2013 | Okimitsu | H02K 3/12 310/201 |
| 2014/0113472 A1* | 4/2014 | Chamberlin | H02K 3/50 439/212 |

FOREIGN PATENT DOCUMENTS

| | | |
|---|---|---|
| JP | 06-233483 A | 8/1994 |
| KR | 2011-0008582 U | 9/2011 |

* cited by examiner

*Primary Examiner* — Ramon M Barrera
(74) *Attorney, Agent, or Firm* — Rabin & Berdo, P.C.

(57) ABSTRACT

At least one bus bar, out of a plurality of bus bars of a bus bar unit, includes: a bent main body part that bends and extends across a first stacked position and a second stacked position, the positions being separated in the axial direction of the stator; a first arc-shaped main body part that extends from one end of the bent main body part to be arranged next to another bus bar at the first stacked position along a circumferential direction of the stator; and a second arc-shaped main body part that extends from other end of the bent main body part to be arranged next to another bus bar at the second stacked position along the circumferential direction of the stator.

3 Claims, 8 Drawing Sheets

BUS BAR UNIT

TECHNICAL FIELD

The present invention relates to a bus bar unit that is connected to a winding of a motor, a power generator or the like, and that supplies a current to the winding.

BACKGROUND ART

It is well known that a bus bar unit is employed in a stator of a motor and the like so as to supply a current from external terminal units to windings of respective coils.

JP6-233483A discloses a bus bar unit that is provided with bus bars corresponding to a U-phase, a V-phase, a W-phase and an N-phase as a neutral point, and an insulating resin that holds the bus bars while allowing these to be separated in the axial direction of the stator.

SUMMARY OF INVENTION

According to the above-described conventional bus bar unit, four stacked positions (layers), in which the respective bus bars are received, are provided in such a manner that the stacked positions are arranged next to each other in the axial direction of the stator, which increases the axial dimension of the bus bar unit, and increases the axial dimension of the motor on which the bus bar unit is mounted.

It is an object of the present invention to provide a bus bar unit that can reduce its axial dimension.

According to one aspect of the present invention, a bus bar unit includes a plurality of bus bars to which winding terminals of a plurality of coils that forms a stator are connected, the plurality of the bus bars being arranged along an axial direction of the stator, wherein at least one bus bar, out of the plurality of the bus bars, includes: a bent main body part that bends and extends across a first stacked position and a second stacked position, the positions being separated in the axial direction of the stator; a first arc-shaped main body part that extends from one end of the bent main body part to be arranged next to another bus bar at the first stacked position along a circumferential direction of the stator; and a second arc-shaped main body part that extends from other end of the bent main body part to be arranged next to another bus bar at the second stacked position along the circumferential direction of the stator.

DESCRIPTION OF EMBODIMENTS

With reference to the drawings, an embodiment of the present invention will be described.

Figure 1:
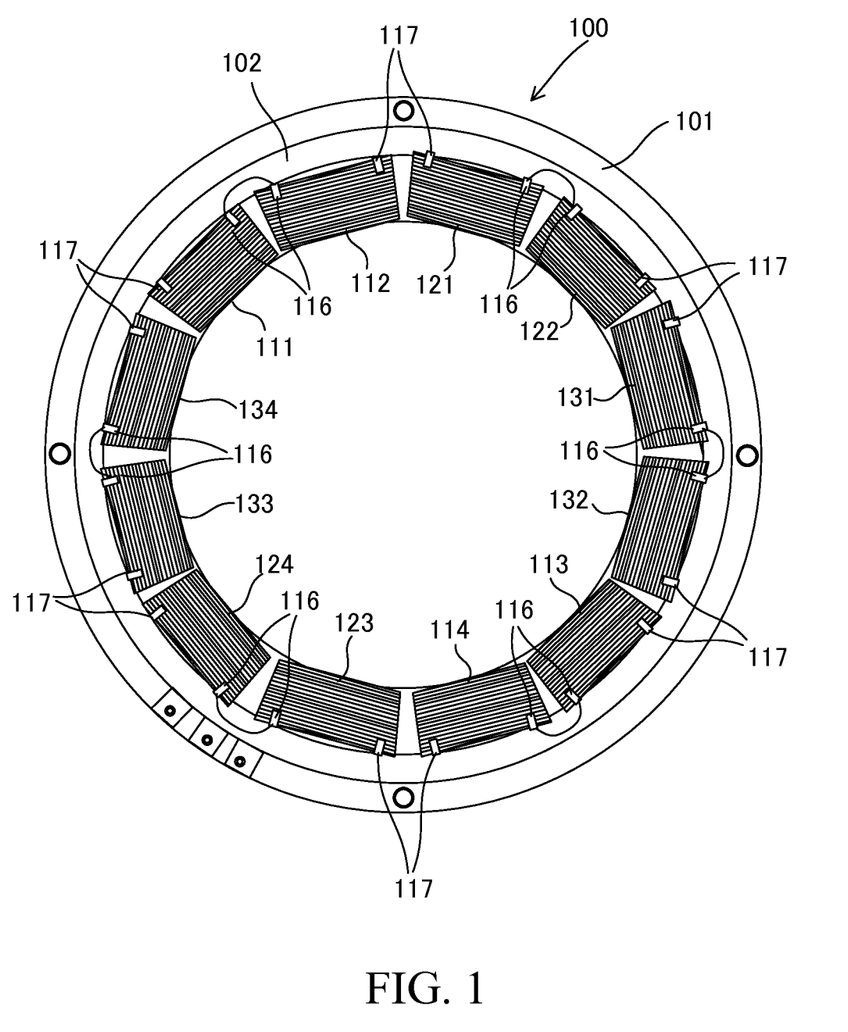
FIG. 1 is a structure diagram of a stator that forms a three phase AC motor.

FIG. 1 is a structure diagram illustrating a stator 100 that forms a three phase AC motor.

A plurality of teeth, which are not illustrated, are formed on a circular stator core 102 that is held in a housing 101 in such a manner that the teeth project toward the inner periphery side. Copper wires are wound around the teeth to form coils 111 to 114, 121 to 124, and 131 to 134.

On the stator core 102, twelve coils in total, that is, U-phase coils 111 to 114, V-phase coils 121 to 124, and W-phase coils 131 to 134, are disposed annularly along the circumferential direction of the stator 100.

A first U-phase coil 111 and an adjacent second U-phase coil 112 are arranged opposingly to a third U-phase coil 113 and an adjacent fourth U-phase coil 114. Further, a first V-phase coil 121 and an adjacent second V-phase coil 122 are arranged opposingly to a third V-phase coil 123 and an adjacent fourth V-phase coil 124. Furthermore, a first W-phase coil 131 and an adjacent second W-phase coil 132 are arranged opposingly to a third W-phase coil 133 and an adjacent fourth W-phase coil 134.

A bus bar unit 1 supplies a current, supplied from a not-illustrated power source, to the U-phase coils 111 to 114, the V-phase coils 121 to 124, and the W-phase coils 131 to 134, via a U-phase terminal 19, a V-phase terminal 29, a W-phase terminal 39 (FIG. 2) as external terminals. The coils 111 to 114, 121 to 124 and 131 to 134 of the respective phases are connected to the bus bar unit 1 via winding terminals 117 of the coils 111 to 114, 121 to 124 and 131 to 134 of the respective phases. Moreover, the adjacent coils of the respective phases are connected to each other via winding terminals 116.

One ends of the first U-phase coil 111 and the fourth U-phase coil 114 are connected to the U-phase terminal 19 via a bus bar 10. The other ends of the first U-phase coil 111 and the fourth U-phase coil 114 are connected to one ends of the second U-phase coil 112 and the third U-phase coil 113. The other ends of the second U-phase coil 112 and the third U-phase coil 113 are connected to a neutral point via a neutral point bus bar 40.

The first U-phase coil 111 and the second U-phase coil 112 are connected to each other in series. The third U-phase coil 113 and the fourth U-phase coil 114 are connected to each other in series. Further, the first U-phase coil 111 and the second U-phase coil 112 are connected in parallel to the third U-phase coil 113 and the fourth U-phase coil 114, between the U-phase terminal 19 and the neutral point. In other words, the U-phase coils 111 to 114 have the two series/two parallel connection.

Similarly, one ends of the first V-phase coil 121 and the fourth V-phase coil 124 are connected to the V-phase terminal 29 via a bus bar 20. The other ends of the first V-phase coil 121 and the fourth V-phase coil 124 are connected to one ends of the second V-phase coil 122 and the third V-phase coil 123. The other ends of the second V-phase coil 122 and the third V-phase coil 123 are connected to the neutral point via the neutral point bus bar 40.

Similarly, one ends of the first W-phase coil 131 and the fourth W-phase coil 134 are connected to the W-phase terminal 39 via a bus bar 30. The other ends of the first W-phase coil 131 and the fourth W-phase coil 134 are connected to one ends of the second W-phase coil 132 and the third W-phase coil 133. The other ends of the second W-phase coil 132 and the third W-phase coil 133 are connected to the neutral point via the neutral point bus bar 40.

The U-phase terminal 19, the V-phase terminal 29, and the W-phase terminal 39 of the bus bar unit 1 are connected to an external wiring that is connected to a not-illustrated power source, and power is supplied from the external wiring. Meanwhile, potentials of the respective coils 112, 113, 122, 123, 132, and 133 that are connected to the neutral point are brought to the same potential via the neutral point bus bar 40.

Figure 2:
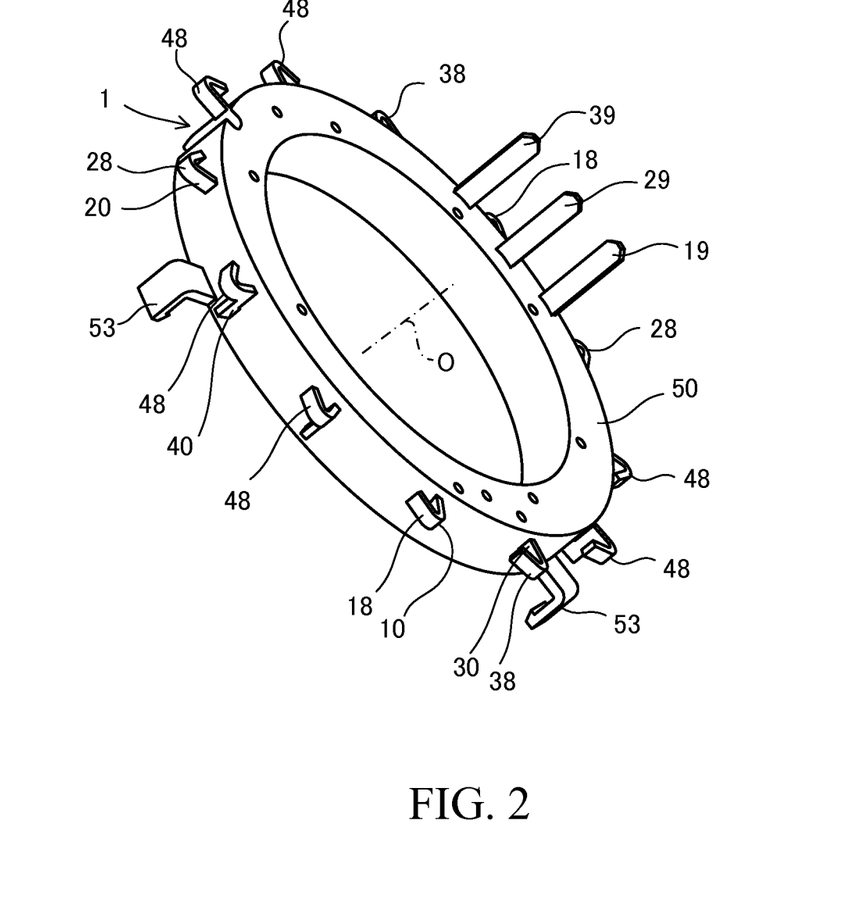
FIG. 2 is a perspective view illustrating a bus bar unit.

FIG. 2 is a perspective view illustrating the bus bar unit 1.

An axis O is the center line of the bus bar unit 1 and the stator 100. In the following explanation, the "axial direction" means the direction along which the axis O extends, the "radial direction" means the radiation direction about the axis O, and the "circumferential direction" means the direction around the axis O.

The bus bar unit 1 is provided concentrically with the stator 100 at the end of the axial direction of the stator 100. The stator 100 is arranged on the lower side of the bus bar unit 1 in FIG. 2. The bus bar unit 1 is formed by the bus bars 10, 20, and 30 that correspond to the respective phases, the neutral point bus bar 40 that electrically connects the neutral point, and an insulating resin body 50 that receives all the bus bars 10, 20, 30, and 40, and that holds the bus bars 10, 20, 30, and 40 at predetermined positions while electrically insulating the bus bars 10, 20, 30, and 40.

The respective bus bars 10, 20, 30, and 40 and the insulating resin body 50 are integrally molded by insert molding, for example. A plurality of arms 53, projecting from the outer periphery of the insulating resin body 50, engage with engagement parts (not illustrated) on the outer periphery of the stator 100, so as to fix the insulating resin body 50 to the stator 100.

Figure 3:
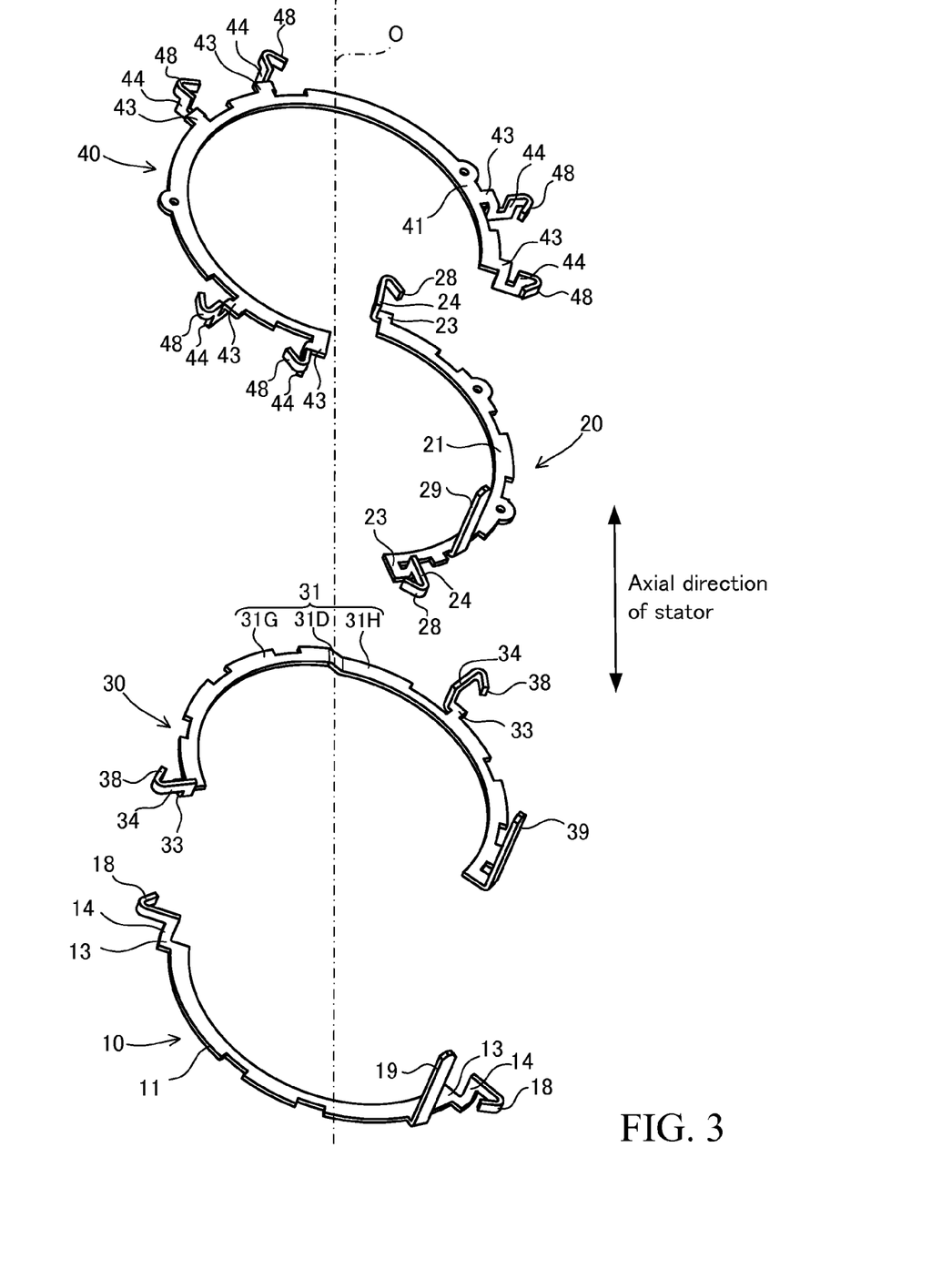
FIG. 3 is a perspective view illustrating first to fourth bus bars.

FIG. 3 is a perspective view illustrating the first to fourth bus bars 10, 20, 30, and 40.

The bus bar unit 1 is provided with the first bus bar 10 that is connected to the U-phase coils 111 and 114, the second bus bar 20 that is connected to the V-phase coils 121 and 124, the third bus bar 30 that is connected to the W-phase coils 131 and 134, and the fourth bus bar 40 for the neutral point that is connected to the U-phase coils 112 and 113, the V-phase coils 122 and 123, and the W-phase coils 132 and 133.

The first to fourth bus bars 10, 20, 30, and 40 respectively include main body parts 11, 21, 31, and 41 that are extended along the circumferential direction in such a manner that the plate thickness direction agrees with the axial direction, a plurality of projection parts 13, 23, 33, and 43 that project from the outer peripheries of the main body parts 11, 21, 31, and 41 to the outer side of the radial direction, extension parts 14, 24, 34, and 44 that are bent from the projection parts 13, 23, 33, and 43 and that are extended in the axial direction and the radial direction, and connection parts 18, 28, 38, and 48 that are provided at the tips of the extension direction of the extension parts 14, 24, 34, and 44 and that are connected to the winding terminals 117 of the coils of the respective phases 111 to 114, 121 to 124 and 131 to 134.

After a flat conductive material is punched to predetermined shapes, the extension parts 14, 24, 34, and 44 are bent from the projection parts 13, 23, 33, and 43, and the connection parts 18, 28, 38, and 48 are bent from the extension parts 14, 24, 34, and 44, so as to form the first to fourth bus bars 10, 20, 30, and 40.

Punching widths of the extension parts 14, 24, 34, and 44 are set to be equal to or greater than punching widths of the projection parts 13, 23, 33, and 43, so as to secure the cross-sectional area of the conductive material sufficiently.

Each of the main body parts 11, 21, 31, and 41 is formed to have an arc shape that is extended along the circumferential direction in such a manner that the plate thickness direction agrees with the axial direction. In other words, the thicknesses in the axial direction of the main body parts 11, 21, 31, and 41 are the plate thicknesses of the conductive material, and the widths in the radial direction are the punching widths of the conductive material.

The first bus bar 10, corresponding to the U-phase, is provided with the U-phase terminal 19 that is extended in the axial direction from the main body part 11 to the outside of the insulating resin body 50, and that is connected to the external wiring. Similarly, the second bus bar 20, corresponding to the V-phase, is provided with the V-phase terminal 29. Similarly, the third bus bar 30, corresponding to the W-phase, is provided with the W-phase terminal 39. The bus bar unit 1 distributes a current, supplied from the not-illustrated power source, to the coils of the respective phases 111 to 114, 121 to 124, and 131 to 134 via the U-phase terminal 19, the V-phase terminal 29, and the W-phase terminal 39 as the external terminals.

Figure 4:
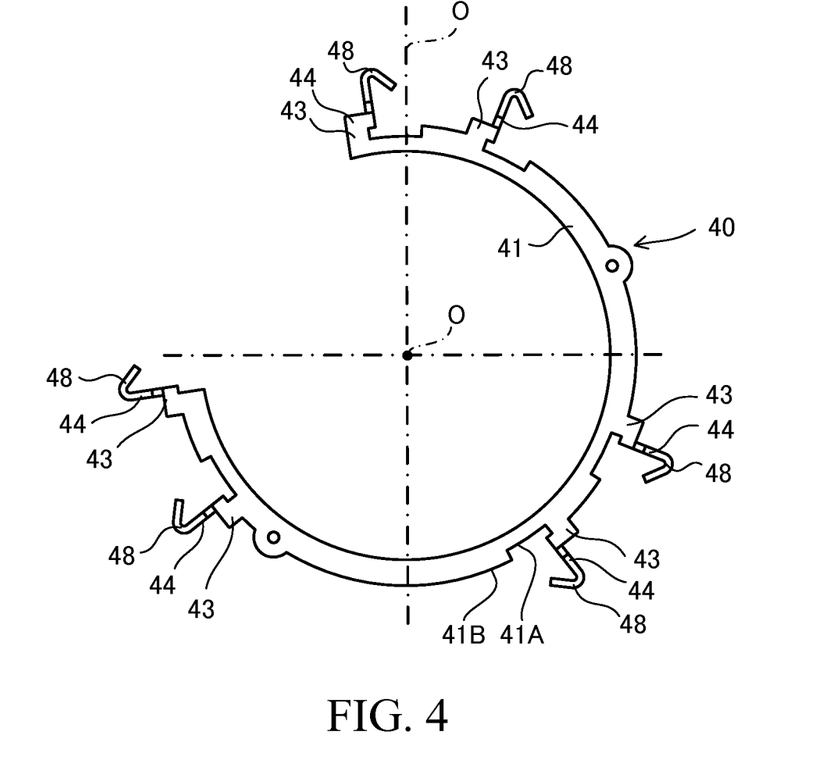
FIG. 4 is a front view illustrating the fourth bus bar.
Figure 5:
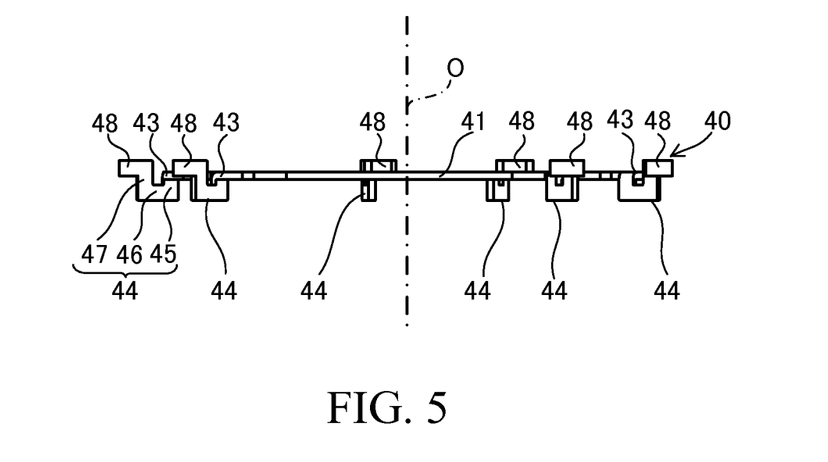
FIG. 5 is a side view illustrating the fourth bus bar.

FIG. 4 is a front view of the fourth bus bar 40, and FIG. 5 is a side view of the fourth bus bar 40.

The main body part 41 of the fourth bus bar 40 has an arc shape, in which a part of an annular shape is missing, and extends from the position close to the third U-phase coil 113 to the position close to the third V-phase coil 123. The U-phase terminal 19, the V-phase terminal 29, and the W-phase terminal 39 are arranged at the part where the annular shape is missing in the main body part 41. It should be noted that this is not restrictive and the main body part 41 may have a perfect annular shape.

Each extension part 44 of the fourth bus bar 40 is formed to have a band shape extending in a crank shape from each projection part 43, and is bent from the projection part 43 in the direction approaching the stator 100. The extension part 44 includes a first axial direction extension part 45 that extends in the axial direction (the direction approaching the stator 100), a radial direction extension part 46 that extends in the radial direction from the first axial direction extension part 45, and a second axial direction extension part 47 that extends in the parallel direction to the first axial direction extension part 45 (the direction separating from the stator 100) from the end of the radial direction extension part 46, the end being opposite to the first axial direction extension part 45.

At the time of bending work of each extension part 44, the extension part 44 that is clamped by a jig (not illustrated) is bent at right angles to each projection part 43 that is clamped by another jig (not illustrated).

In the main body part 41, an outer periphery 41A of a portion extending along each extension part 44 has the outer diameter that is smaller than that of an outer periphery 41B of the portion adjacent thereto, and thus a gap is formed between the extension part 44 and the outer periphery 41A of the main body part 41. This makes it possible to avoid interference between the jig that clamps the extension part 44 at the time of the bending work and the main body part 41.

The length in the axial direction of the second axial direction extension part 47 is set to be equal to the length in the axial direction of the first axial direction extension part 45. Thereby, each connection part 48 is arranged at the same position as the main body part 41 with respect to the axial direction.

The six connection parts 48 are arranged on the fourth bus bar 40 with predetermined intervals in the circumferential direction. Each connection part 48 is a portion that projects from the tip of the radial direction of the second axial direction extension part 47, and this portion is bent in a hook shape.

Figure 6:
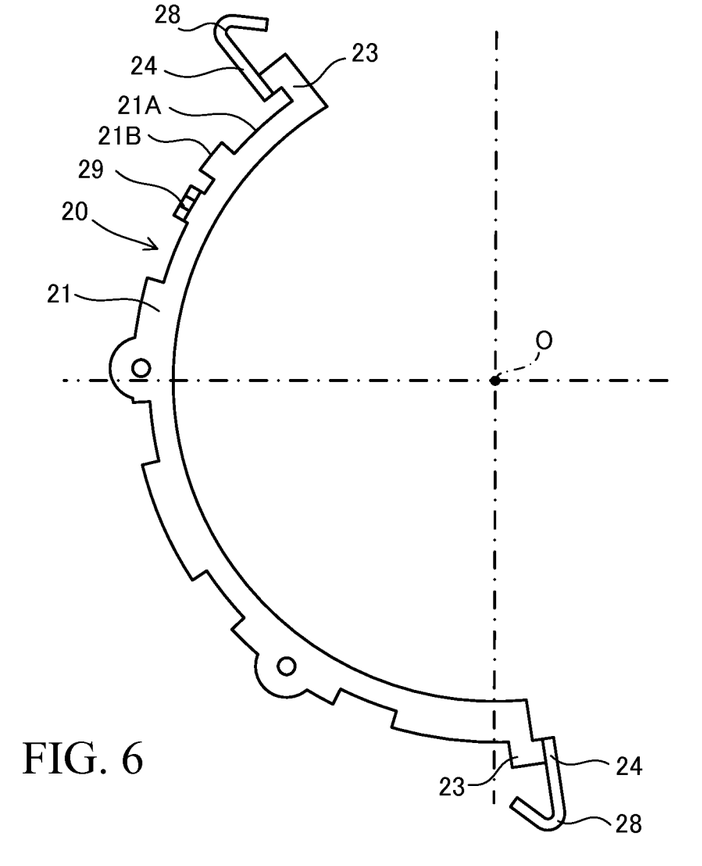
FIG. 6 is a front view illustrating the second bus bar.
Figure 7:
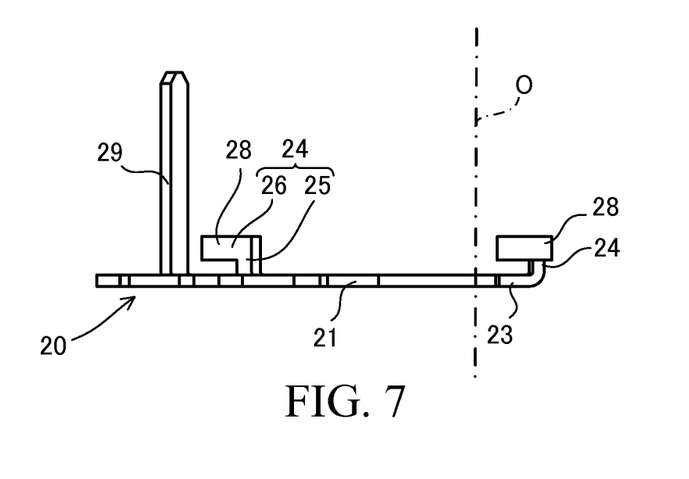
FIG. 7 is a side view illustrating the second bus bar.

FIG. 6 is a front view of the second bus bar 20, and FIG. 7 is a side view of the second bus bar 20.

The main body part 21 of the second bus bar 20 has a semicircular arc shape, and extends from the position close to the first V-phase coil 121 to the position close to the fourth W-phase coil 134.

Each extension part 24 of the second bus bar 20 is formed to have a band shape extending in a crank shape from each projection part 23, and is provided with a first axial direction extension part 25 that extends in the axial direction (the direction separating from the stator 100), and a radial direction extension part 26 that extends in the radial direction from the first axial direction extension part 25.

In the second bus bar 20, an outer periphery 21A of the main body part 21 that extends along each extension part 24 has the outer diameter that is smaller than that of an outer periphery 21B adjacent thereto, and thus a gap is formed between the extension part 24 and the outer periphery 21A of the main body part 21. This makes it possible to avoid the interference between the jig that clamps the extension part 24 at the time of the bending work and the main body part 21.

As each extension part 24 is bent from each projection part 23 in the direction separating from the stator 100, each connection part 28 is offset from the main body part 21 in the direction separating from the stator 100 in the axial direction. When the dimension of the first axial direction extension part 25 is set appropriately, the connection part 28 is arranged at the same position as each connection part 48 of the fourth bus bar 40 with respect to the axial direction. When the dimension of the radial direction extension part 26 is set appropriately, the connection part 28 is arranged at the same position as each connection part 48 of the fourth bus bar 40 with respect to the radial direction.

The two connection parts 28 are arranged at both ends of the second bus bar 20. Each connection part 28 is a portion that projects from the tip of the radial direction of the radial direction extension part 26, and this portion is bend in a hook shape.

Figure 8:
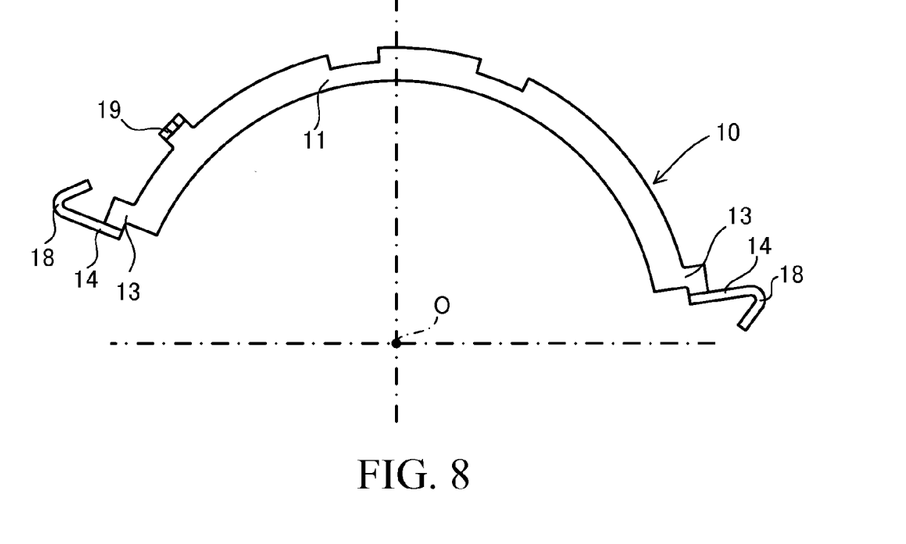
FIG. 8 is a front view illustrating the first bus bar.
Figure 9:
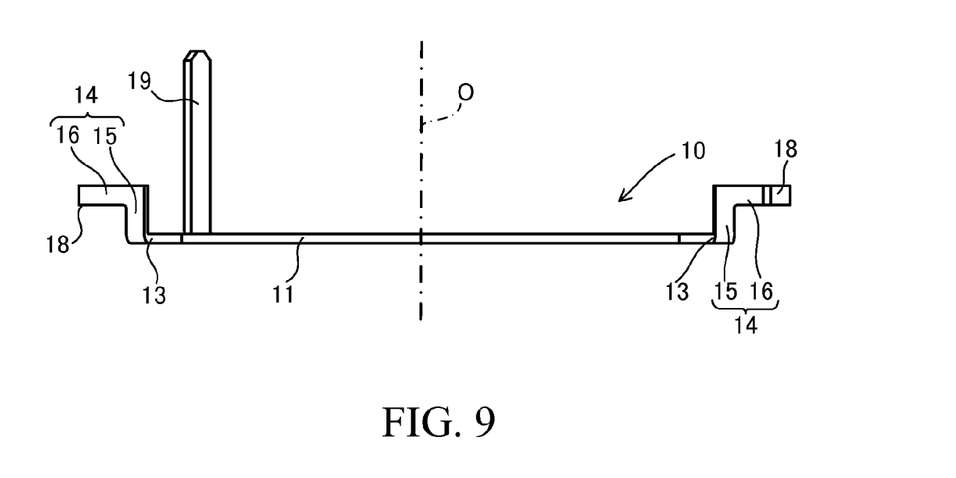
FIG. 9 is a side view illustrating the first bus bar.

FIG. 8 is a front view of the first bus bar 10, and FIG. 9 is a side view of the first bus bar 10.

The main body part 11 of the first bus bar 10 has a semicircular arc shape, and extends from the position close to the fourth U-phase coil 114 to the position close to the first U-phase coil 111.

Each extension part 14 of the first bus bar 10 is formed to have a band shape extending in a crank shape from each projection part 13, and is provided with a first axial direction extension part 15 that extends in the axial direction (the direction separating from the stator 100), and a radial direction extension part 16 that extends in the radial direction from the first axial direction extension part 15.

As each extension part 14 is bent from each projection part 13 in the direction separating from the stator 100, each connection part 18 is offset from the main body part 11 in the direction separating from the stator 100 in the axial direction. When the dimension of the first axial direction extension part 15 is set appropriately, the connection part 18 is arranged at the same position as each connection part 48 of the fourth bus bar 40 with respect to the axial direction. When the dimension of the radial direction extension part 16 is set appropriately, the connection part 18 is arranged at the same position as each connection part 48 of the fourth bus bar 40 with respect to the radial direction.

The two connection parts 18 are arranged at both ends of the main body part 11. Each connection part 18 is a portion that projects from the tip of the radial direction of the radial direction extension part 16, and this portion is bend in a hook shape.

Figure 10:
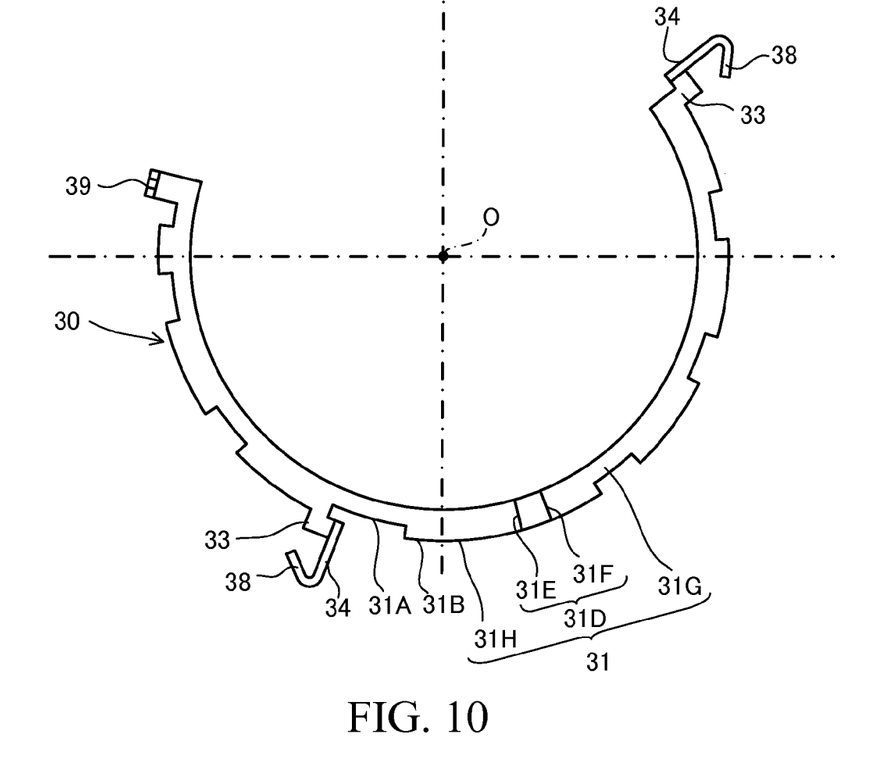
FIG. 10 is a front view illustrating the third bus bar.
Figure 11:
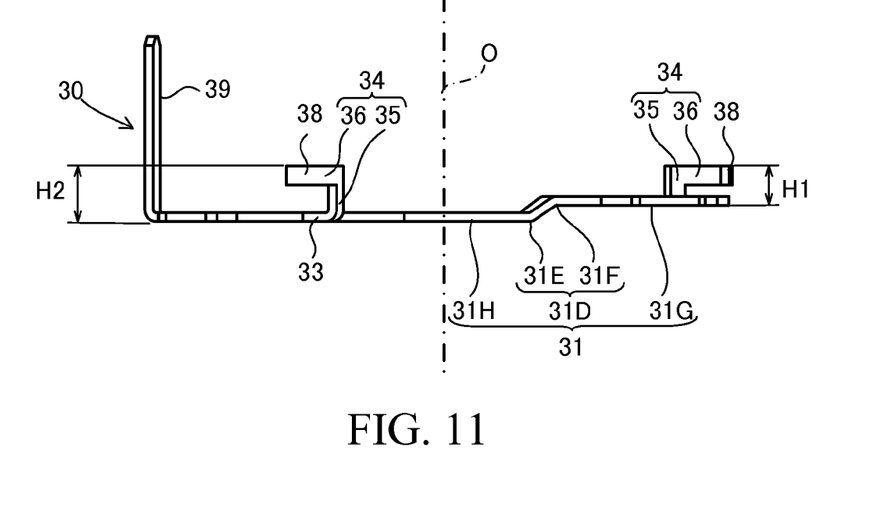
FIG. 11 is a side view illustrating the third bus bar.

FIG. 10 is a front view of the third bus bar 30, and FIG. 11 is a side view of the third bus bar 30.

The main body part 31 of the third bus bar 30 has an arc shape, in which a part thereof is missing, and extends from the position close to the fourth U-phase coil 114 to the position close to the fourth W-phase coil 134.

A bent main body part 31D is formed in the middle of the main body part 31. The bent main body part 31D includes two bent parts 31E and 31F that are bent along lines extending in the radial direction, and its cross section bends to have a crank shape.

In the main body part 31, a first main body part 31G and a second main body part 31H are formed, the first main body extends in an arc shape in the circumferential direction (counterclockwise direction in FIG. 10) from the bent main body part 31D, and the second main body part 31H extends in an arc shape in the circumferential direction (clockwise direction in FIG. 10) from the bent main body part 31D.

The first main body part 31G is arranged next to the first bus bar 10 along the circumferential direction, at a first stacked position that will be described later (refer to FIG. 12). One connection part 38 is arranged at the tip of the first main body part 31G.

The second main body part 31H is arranged next to the second bus bar 20 along the circumferential direction, at a second stacked position that will be described later (refer to FIG. 12). One connection part 38 is arranged in the middle of the second main body part 31H, and the W-phase terminal 39 is arranged at the tip of the second main body part 31H.

Each of the two extension parts 34 is formed to have a band shape extending in a crank shape from the projection part 33, and includes a first axial direction extension part 35 that extends in the axial direction (the direction separating from the stator 100) and a radial direction extension part 36 that extends from the first axial direction extension part 35 in the radial direction.

In the second main body part 31H, an outer periphery 31A of a portion that extends along each extension part 34 has the outer diameter that is smaller than that of an outer periphery 31B of the portion adjacent thereto, and thus a gap is formed between the extension part 34 and the outer periphery 31A of the main body part 31. This makes it possible to avoid the interference between the jig that clamps the extension part 34 at the time of the bending work and the main body part 31.

As each extension part 34 is bent from each projection part 33 in the direction separating from the stator 100, each connection part 38 is offset from the main body part 31 in the direction separating from the stator 100 in the axial direction.

A dimension H1 in the axial direction of the first axial direction extension part 35 that is provided on the first main body part 31G is set to be smaller than a dimension H2 of the first axial direction extension part 35 that is provided on the second main body part 31H. A difference between the dimensions (H2-H1) is set to be equal to the length between the first stacked position and the second stacked position separating in the axial direction. Thereby, the connection part 38 that is provided on the first main body part 31G and the connection part 38 that is provided on the second main body part 31H are arranged at the same positions in the axial direction. Therefore, the respective connection parts 38 are arranged at the same positions as the connection parts 48 of the fourth bus bar 40, with respect to the axial direction.

Each connection part 38 is a portion that projects from the tip of the radial direction of the radial direction extension part 36, and this portion is bent in a hook shape.

When the dimension of the radial direction extension part 36 is set appropriately, each connection part 38 is arranged at the same position as each connection part 48 of the fourth bus bar 40 with respect to the radial direction.

Incidentally, the shapes of the connection parts 18, 28, 38, and 48 are not limited to those bent in the hook shapes, as described above, and may have other shapes.

Figure 12:
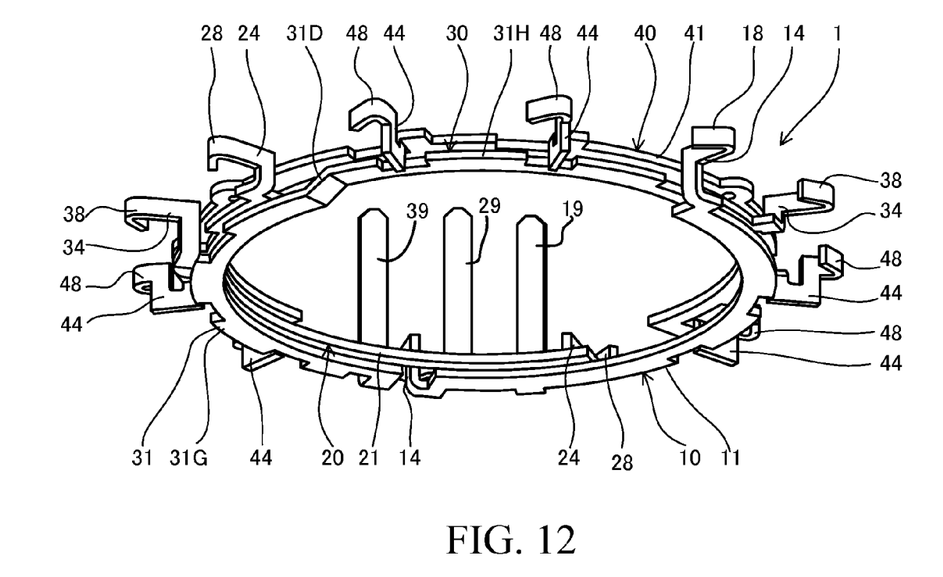
FIG. 12 is a perspective view illustrating the first to fourth bus bars that are stacked.

FIG. 12 is a perspective view in which the first to fourth bus bars 10, 20, 30, and 40 are assembled at the respective stacked positions, without illustrating the insulating resin body 50.

The bus bar unit 1 has the first stacked position, the second stacked position, and a third stacked position that are separated in order from the stator 100 in the axial direction. At the first stacked position that is closest to the stator 100, the main body part 11 of the first bus bar 10 is arranged. At the second stacked position that is next closest to the stator 100, the main body part 21 of the second bus bar 20 is arranged. The main body part 31 of the third bus bar 30 is arranged across the first stacked position and the second stacked position. At the third stacked position that is farthest from the stator 100, the main body part 41 of the fourth bus bar 40 is arranged.

The bent main body part 31D of the third bus bar 30, which is bent in a crank shape, is arranged across the first stacked position and the second stacked position.

At the first stacked position, the first main body part 31G, extending in the arc shape from the bent main body part 31D, is arranged next to the main body part 11 of the first bus bar 10 along the circumferential direction. As the first main body part 31G is separated in the circumferential direction from the main body part 11 of the first bus bar 10, the first main body part 31G and the main body part 11 of the first bus bar 10 are kept insulated.

A part of the first main body part 31G is arranged so as to overlap the main body part 21 of the second bus bar 20. As the first main body part 31G is separated in the axial direction from the main body part 21 of the second bus bar 20, the first main body part 31G and the main body part 21 of the second bus bar 20 are kept insulated.

At the second stacked position, the second main body part 31H, extending in the arc shape from the bent main body part 31D, is arranged next to the main body part 21 of the second bus bar 20 along the circumferential direction. As the second main body part 31H is separated in the circumferential direction from the main body part 21 of the second bus bar 20, the second main body part 31H and the main body part 21 of the second bus bar 20 are kept insulated.

A part of the second main body part 31H is arranged so as to overlap the main body part 11 of the first bus bar 10. As the second main body part 31H is separated in the axial direction from the main body part 11 of the first bus bar 10, the second main body part 31H and the main body part 11 of the first bus bar 10 are kept insulated.

With regard to the main body part 31 of the third bus bar 30, the first main body part 31G is arranged at the first stacked position together with the main body part 11 of the first bus bar 10, and the second main body part 31H is arranged at the second stacked position together with the main body part 21 of the second bus bar 20. This makes it possible to reduce the axial dimension of the bus bar unit 1 as compared with the one in which the stacked position where the main body part 31 of the third bus bar 30 is arranged is provided independently.

The insert molding is performed in the state of stacking the first to fourth bus bars 10, 20, 30, and 40 as above. The insert molding is performed by receiving the first to fourth bus bars 10, 20, 30, and 40 in a mold (not illustrated), and by injecting an insulating resin material into the mold.

After the insulating resin material is cured, the bus bar unit 1, in which the first to fourth bus bars 10, 20, 30, and 40 and the insulating resin body 50 are combined, is removed from the mold, and thus the bus bar unit 1 as illustrated in FIG. 2 is finished.

The bus bar unit 1 is configured like this, and the twelve connection parts 18, 28, and 38 are arranged on the outer periphery of the bus bar unit 1 at equal intervals in the circumferential direction. This bus bar unit 1 is attached to the end of the stator 100.

The following effects can be obtained according to the above-described embodiment.

At least one bus bar 30, out of the plurality of bus bars 10, 20, and 30 of the bus bar unit 1, is provided with the bent main body part 31D that bends and extends across the first stacked position and the second stacked position, the positions being separated in the axial direction of the stator 100, the first arc-shaped main body part 31G that is one end of the bent main body part 31D extending to be arranged next to another bus bar 10 at the first stacked position along the circumferential direction of the stator 100, and the second arc-shaped main body part 31H that is the other end of the bent main body part 31D extending to be arranged next to another bus bar 20 at the second stacked position along the circumferential direction of the stator 100.

Thus, one of the bus bars, that is, the bus bar 30 is arranged next to the two different bus bars 10 and 20 across the first stacked position and the second stacked position, along the circumferential direction. This makes it possible to reduce the number of the stacked positions (layers) provided in the bus bar unit 1, and to downsize the axial dimension of the bus bar unit 1. Therefore, the motor on which the bus bar unit 1 is mounted can be reduced in size.

Further, the plurality of bus bars 10, 20, 30, and 40 include: the first bus bar 10, the second bus bar 20, and the third bus bar 30, the bus bars 10, 20, and 30 electrically connecting the coils that correspond to the respective phases of the stator 100 and that are arranged opposingly; and the fourth bus bar 40 that electrically connects the neutral point of the respective coils. The first bus bar 10 is arranged at the first stacked position, the second bus bar 20 is arranged at the second stacked position, the third bus bar 30 is arranged across the first stacked position and the second stacked position via the bent main body part 31D, and the fourth bus bar 40 is arranged at the third stacked position that is at the position different from the first stacked position and the second stacked position.

Thereby, the four bus bars 10, 20, 30, and 40 are arranged at the three stacked positions, and thus the axial dimension of the bus bar unit 1 can be downsized.

As the bus bar unit 1 is formed by receiving the U-phase bus bar 10, the V-phase bus bar 20, the W-phase bus bar 30, and the bus bar for the neutral point 40 in the insulating resin body 50 having the three layers (stacked positions), the dimension in the axial direction of the bus bar unit 1 can be reduced as compared with the bus bar unit in which the bus bars 10, 20, 30, and 40 are received in four layers.

Further, the bus bars 10, 20, and 30 corresponding to the respective phases respectively include: the two connection parts 18, 28, and 38 that are arranged opposingly and that are connected to the coils 111, 114, 121, 124, 131, and 134; and the external terminals 19, 29, and 39 that are connected to the external wiring. The coils that correspond to the respective phases and that are arranged opposingly are connected in parallel between the external terminals 19, 29, and 39 of the respective phases and the neutral point, and thus the bus bar unit 1 can be applied to the motor in which the respective phases are arranged opposingly.

Furthermore, the coils 111 to 114, 121 to 124, and 131 to 134 are configured in such a manner that the adjacent two coils are arranged opposingly, and the two coils are connected in series between the external terminals 19, 29, and 39 of the respective phases and the neutral point. Thus, the bus bar unit 1 can be applied to the motor in which the two coils are arranged opposingly.

Further, each of the first main body part 31G and the second main body part 31H of the third bus bar 30 is extended along the circumferential direction of the stator 100 in such a manner that its plate thickness direction agrees with the axial direction of the stator 100, and is provided with the extension part 34 that projects from the outer periphery of the first main body part 31G or the second main body part 31H to the outer side of the radial direction of the stator 100 and that extends in the axial direction and the radial direction of the stator 100; and the connection part 38 that is provided at the tip of the extension direction of the extension part 34 and that is connected to the winding terminal of the coil. As the length of the extension part 34 that is extended from the first main body part 31G and the length of the extension part 34 that is extended from the second main body part 31H are made different, the connection parts 38 are arranged at the same positions with respect to the axial direction of the stator 100.

Thereby, it is possible for the bus bar 30 to arrange the plurality of connection parts 38, provided with the bent main body part 31D therebetween, at the same positions with respect to the axial direction of the stator 100.

Embodiments of this invention were described above, but the above embodiments are merely examples of applications of this invention, and the technical scope of this invention is not limited to the specific constitutions of the above embodiments.

For example, according to the above-described embodiment, the two coils, corresponding to the respective phases, are arranged opposingly, so as to make the two series/two parallel connection of the coils 111 to 114, 121 to 124, and 131 to 134 of the respective phases. However, three or more coils may be arranged opposingly. Namely, three series/two parallel connection is made when the three coils are arranged opposingly, and four series/two parallel connection is made when the four coils are arranged opposingly.

Further, according to the above-described embodiment, the three phase AC motor having the twelve coils 111 to 114, 121 to 124, and 131 to 134 has been explained as an example, but the number of the coils is not restrictive. Each of the first to third bus bars may be provided in a plural number as the number of the coils provided in the stator increases.

Furthermore, according to the above-described embodiment, the first to fourth bus bars 10, 20, 30, and 40 are disposed in the order of the first bus bar 10, the second bus bar 20, the third bus bar 30, and the fourth bus bar 40, but may be arranged according to different orders.

Further, according to the above-described embodiment, the case of providing the four types of the bus bars 10, 20, 30, and 40 has been explained as the example, but three or less or five or more types of bus bars may be provided according to the type of the motor.

Furthermore, the bus bar unit 1 may be employed in a generator that generates electric power by motive power, not only in the motor that generates motive power by electric power.

This application claims priority based on Japanese Patent Application No. 2013-047247 filed with the Japan Patent Office on Mar. 8, 2013, the entire contents of which are incorporated into this specification.

The invention claimed is:

1. A bus bar unit comprising
a plurality of bus bars to which winding terminals of a plurality of coils that forms a stator are connected, the plurality of the bus bars being arranged along an axial direction of the stator,
wherein at least one bus bar, out of the plurality of the bus bars, comprises:
a bent main body part that bends and extends across a first stacked position and a second stacked position, the positions being separated in the axial direction of the stator;
a first arc-shaped main body part that extends from one end of the bent main body part to be arranged next to another bus bar at the first stacked position along a circumferential direction of the stator; and
a second arc-shaped main body part that extends from other end of the bent main body part to be arranged next to another bus bar at the second stacked position along the circumferential direction of the stator.

2. The bus bar unit according to claim 1,
wherein the plurality of bus bars comprise a first bus bar, a second bus bar, a third bus bar and a fourth bus bar, the first, second and third bus bars electrically connecting the coils corresponding to respective phases of the stator, a fourth bus bar electrically connecting a neutral point of the coils,
wherein the first bus bar is arranged at the first stacked position,
the second bus bar is arranged at the second stacked position,
the third bus bar is arranged across the first stacked position and the second stacked position via the bent main body part, and
the fourth bus bar is arranged at a third stacked position that is at a position separated in the axial direction of the stator from the first stacked position and the second stacked position.

3. The bus bar unit according to claim 1,
wherein each of the first main body part and the second main body part is extended along the circumferential direction of the stator in such a manner that its plate thickness direction agrees with the axial direction of the stator, and comprises:
an extension part that projects from an outer periphery of the first main body part or the second main body part to an outer side of a radial direction of the stator, the extension part extending in the axial direction and the radial direction of the stator; and
a connection part that is provided at a tip of an extension direction of the extension part, the connection part being connected to the winding terminal of the coil, and
a length of the extension part extended from the first main body part and a length of the extension part extended from the second main body part are made different, so that the connection parts are arranged at same positions with respect to the axial direction of the stator.

\* \* \* \* \*